United States Patent
Xu et al.

(10) Patent No.: US 9,838,147 B2
(45) Date of Patent: Dec. 5, 2017

(54) LINE CARD, OPTICAL MODULE, AND OPTICAL NETWORK DEVICE

(71) Applicant: Huawei Technologies Co., Ltd., Shenzhen (CN)

(72) Inventors: Zhiguang Xu, Shenzhen (CN); Huafeng Lin, Shenzhen (CN); Xiaoping Zhou, Shenzhen (CN); Dekun Liu, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 9 days.

(21) Appl. No.: 14/742,437

(22) Filed: Jun. 17, 2015

(65) Prior Publication Data

US 2015/0288477 A1 Oct. 8, 2015

Related U.S. Application Data

(63) Continuation of application No. PCT/CN2013/089664, filed on Dec. 17, 2013.

(30) Foreign Application Priority Data

Dec. 17, 2012 (CN) .......................... 2012 1 0547960

(51) Int. Cl.
*H04B 10/40* (2013.01)
*H04J 14/02* (2006.01)
(Continued)

(52) U.S. Cl.
CPC ............ *H04J 14/02* (2013.01); *G02B 6/4278* (2013.01); *H04B 10/27* (2013.01); *H04B 10/40* (2013.01)

(58) Field of Classification Search
CPC .......... H04B 10/27; H04B 10/40; H04J 14/02
See application file for complete search history.

(56) References Cited

U.S. PATENT DOCUMENTS 5,917,696 A * 6/1999 Peng ........................ G06F 1/181
361/679.33
6,005,769 A * 12/1999 Cho ...................... G06F 1/1632
361/679.41
(Continued)

FOREIGN PATENT DOCUMENTS

CN 102687049 A 9/2012
CN 102811099 A 12/2012
(Continued)

*Primary Examiner* — Li Liu
(74) *Attorney, Agent, or Firm* — Kilpatrick Townsend & Stockton LLP

(57) ABSTRACT

Embodiments of the present invention provide a line card, an optical module, and an optical network device. The optical module includes at least one electrical interface and at least one optical interface. The wavelength division multiplexer/demultiplexer includes a first interface and a second interface. The panel is disposed on an edge of the mainboard. The electrical interface is electrically connected to the mainboard. The optical interface faces a direction that is from the edge of the mainboard to an interior of the mainboard and that is parallel to the mainboard, and the optical interface is connected to the first interface. The wavelength division multiplexer/demultiplexer is disposed on the mainboard, the second interface is configured to connect to a feeder fiber, and the feeder fiber is configured to connect an optical network device at a sending end and an optical network device at a receiving end.

14 Claims, 4 Drawing Sheets

(51) Int. Cl.
*G02B 6/42* (2006.01)
*H04B 10/27* (2013.01)

(56) References Cited

U.S. PATENT DOCUMENTS

| | | | | |
|---|---|---|---|---|
| 6,108,198 | A * | 8/2000 | Lin | G06F 1/181 312/223.1 |
| 6,796,716 | B1 | 9/2004 | Handforth et al. | |
| 7,805,084 | B2 * | 9/2010 | Togami | H04B 10/40 385/89 |
| 8,135,281 | B2 * | 3/2012 | Zhovnirovsky | H04B 10/803 398/118 |
| 8,155,520 | B1 * | 4/2012 | West | G02B 6/43 398/50 |
| 8,200,094 | B1 * | 6/2012 | Zhovnirovsky | H04B 10/803 398/118 |
| 8,831,433 | B2 * | 9/2014 | Ho | H04B 10/40 398/138 |
| 9,039,303 | B2 * | 5/2015 | Wang | H04B 10/40 385/147 |
| 2003/0099018 | A1 * | 5/2003 | Singh | B82Y 20/00 398/82 |
| 2004/0033079 | A1 * | 2/2004 | Sheth | H04B 10/801 398/135 |
| 2005/0191056 | A1 * | 9/2005 | Coffey | H04J 14/02 398/79 |
| 2006/0291857 | A1 * | 12/2006 | Mackenzie | H04B 10/0779 398/9 |
| 2008/0095541 | A1 * | 4/2008 | Dallesasse | H04B 10/40 398/191 |
| 2008/0181608 | A1 * | 7/2008 | Parker | H04L 49/35 398/52 |
| 2009/0016685 | A1 * | 1/2009 | Hudgins | H04B 10/40 385/92 |
| 2009/0080881 | A1 * | 3/2009 | Yokoyama | H04J 14/0227 398/16 |
| 2009/0180775 | A1 * | 7/2009 | Hudgins | H04B 10/40 398/25 |
| 2009/0225521 | A1 * | 9/2009 | Jiang | H04Q 1/142 361/752 |
| 2010/0067854 | A1 * | 3/2010 | Oki | H01R 13/748 385/92 |
| 2010/0260503 | A1 * | 10/2010 | Zhovnirovsky | H04B 10/803 398/118 |
| 2011/0229096 | A1 * | 9/2011 | Oki | G02B 6/4201 385/92 |
| 2012/0148254 | A1 * | 6/2012 | Yamauchi | G02B 6/4246 398/135 |
| 2012/0201542 | A1 | 8/2012 | Dahlfort | |
| 2012/0237171 | A1 * | 9/2012 | Oki | G02B 6/4292 385/78 |
| 2013/0004167 | A1 * | 1/2013 | Kim | G02B 6/425 398/43 |
| 2013/0058607 | A1 * | 3/2013 | Binkert | G02B 6/43 385/16 |
| 2013/0194772 | A1 * | 8/2013 | Rojo | H04Q 1/112 361/818 |
| 2014/0133803 | A1 * | 5/2014 | Rosenberg | G02B 6/3885 385/33 |
| 2014/0153574 | A1 * | 6/2014 | Louzoun | H04L 1/188 370/392 |
| 2014/0219658 | A1 * | 8/2014 | Xia | H04J 14/06 398/65 |
| 2015/0104177 | A1 * | 4/2015 | Kato | H04B 10/40 398/79 |
| 2015/0180578 | A1 * | 6/2015 | Leigh | G02B 6/4284 398/135 |

FOREIGN PATENT DOCUMENTS

| | | |
|---|---|---|
| CN | 103023568 A | 4/2013 |
| CN | 202978946 U | 6/2013 |
| EP | 1510842 A1 | 3/2005 |
| GB | 2334396 A | 8/1999 |
| WO | 2009105281 A2 | 8/2009 |

* cited by examiner

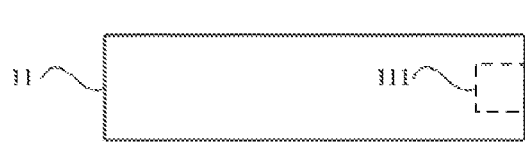
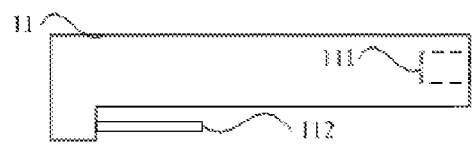
FIG. 2A　　　　　　　　　　　FIG. 2B
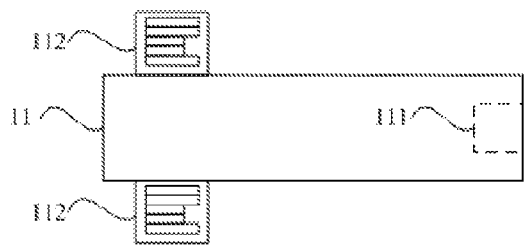
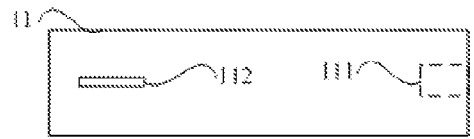
FIG. 2C　　　　　　　　　　　FIG. 2D
FIG. 2E　　　　　　　　　　　FIG. 2F
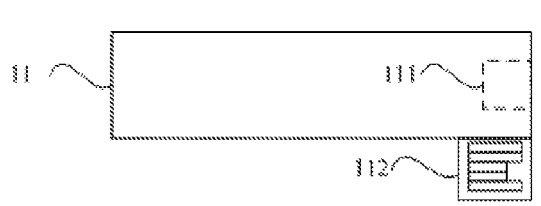
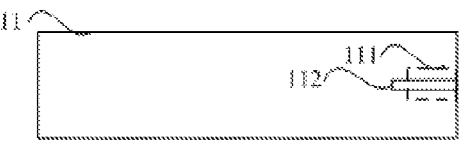
FIG. 2G　　　　　　　　　　　FIG. 2H

LINE CARD, OPTICAL MODULE, AND OPTICAL NETWORK DEVICE

CROSS-REFERENCE TO RELATED APPLICATIONS

This application is a continuation of International Application No. PCT/CN2013/089664, filed on Dec. 17, 2013, which claims priority to Chinese Patent Application No. 201210547960.0, filed on Dec. 17, 2012, both of which are hereby incorporated by reference in their entireties.

TECHNICAL FIELD

Embodiments of the present invention relate to communications technologies, and in particular, to a line card, an optical module, and an optical network device.

BACKGROUND

On a current optical transport network, a wavelength division multiplexing system includes the following key components: an optical transmitter that converts to-be-transmitted information into an optical signal; a receiver that converts a received optical signal into an electrical signal; and a wavelength division multiplexer/demultiplexer that converges multi-wavelength optical signals generated by multiple local transmitters to a feeder fiber connecting to another node and that distributes multi-wavelength optical signals, from the another node, on the feeder fiber to multiple receivers. Generally, one optical transmitter and one optical receiver are encapsulated together and referred to as an optical module.

A wavelength division multiplexing device generally includes a chassis and a line card inserted into the chassis. In a prior art, a wavelength division multiplexer/demultiplexer is disposed on a line card, an optical module is disposed on another line card, and the optical module and the wavelength division multiplexer/demultiplexer are connected by an optical fiber between the line cards; in another prior art, an optical module is disposed on a line card, a wavelength division multiplexer/demultiplexer is disposed within a module outside a chassis, and the optical module and the wavelength division multiplexer/demultiplexer are connected by an optical fiber.

In a process of implementing embodiments of the present invention, the prior art has the following disadvantages: space utilization of an optical network device is low, because optical fiber connection between line cards and between a line card and an external module is complex, and management difficulty is relatively high.

SUMMARY

Embodiments of the present invention provide a line card, an optical module, and an optical network device, so as to improve space utilization of the optical network device, and reduce optical fibers outside the optical network device to reduce management difficulty.

According to a first aspect of the present invention, a line card is provided, including a mainboard, a panel, an optical module, and a wavelength division multiplexer/demultiplexer, where the optical module includes at least one electrical interface and at least one optical interface, the wavelength division multiplexer/demultiplexer includes a first interface and a second interface, the panel is disposed on an edge of the mainboard, the electrical interface is electrically connected to the mainboard, the optical interface faces a direction that is from the edge of the mainboard to an interior of the mainboard and that is parallel to the mainboard, and the optical interface is connected to the first interface, and the wavelength division multiplexer/demultiplexer is disposed on the mainboard, the second interface is configured to connect to a feeder fiber, and the feeder fiber is configured to connect an optical network device at a sending end and an optical network device at a receiving end.

In a first possible implementation manner of the first aspect, an optical module electrical interface socket and an optical module optical interface socket are disposed on the mainboard, an opening direction of the optical module electrical interface socket and an opening direction of the optical module optical interface socket both face a direction that is from the interior of the mainboard to the edge of the mainboard and that is parallel to the mainboard, and the optical module electrical interface socket and the optical module optical interface socket are configured to connect to the electrical interface and the optical interface.

With reference to the first aspect or the first possible implementation manner of the first aspect, in a second possible implementation manner, the first interface faces the direction that is from the edge of the mainboard to the interior of the mainboard and that is parallel to the mainboard, and the second interface faces the direction that is from the interior of the mainboard to the edge of the mainboard and that is parallel to the mainboard, or the first interface faces the direction that is from the edge of the mainboard to the interior of the mainboard and that is parallel to the mainboard, and the second interface faces the direction that is from the edge of the mainboard to the interior of the mainboard and that is parallel to the mainboard.

With reference to the first aspect, or the first or second possible implementation manner of the first aspect, in a third possible implementation manner, an optical connector is disposed on the panel, the optical connector includes a first end and a second end, the first end faces the direction that is from the edge of the mainboard to the interior of the mainboard and that is parallel to the mainboard, and is connected to the second interface, and the second end faces the direction that is from the interior of the mainboard to the edge of the mainboard and that is parallel to the mainboard, and is configured to connect to the feeder fiber.

With reference to the first aspect, or the first, second, or third possible implementation manner of the first aspect, in a fourth possible implementation manner, the optical module and the wavelength division multiplexer/demultiplexer are disposed at one end of the mainboard.

With reference to the fourth possible implementation manner of the first aspect, in a fifth possible implementation manner, the direction that the first interface faces is consistent with the direction that the optical interface faces.

With reference to the first aspect, or the first, second, third, fourth, or fifth possible implementation manner of the first aspect, in a sixth possible implementation manner, the second interface includes a wavelength division multiplexing interface and a wavelength division demultiplexing interface, and the wavelength division multiplexing interface and the wavelength division demultiplexing interface are separately connected to the feeder fiber, or the second interface includes a wavelength division multiplexing/demultiplexing interface, and the wavelength division multiplexing/demultiplexing interface is connected to the feeder fiber.

According to a second aspect of the present invention, an optical module is provided, where the optical module is disposed on a line card, and the optical module includes at least one electrical interface and at least one optical interface, where the electrical interface is electrically connected to a mainboard disposed on the line card, and the optical interface faces a direction that is from an edge of the mainboard to an interior of the mainboard and that is parallel to the mainboard, and is connected to a first interface of a wavelength division multiplexer/demultiplexer disposed on the line card, and a second interface of the wavelength division multiplexer/demultiplexer is connected to a feeder fiber configured to connect to an optical network device at a sending end and an optical network device at a receiving end.

In a first possible implementation manner of the second aspect, the direction that the optical interface faces is consistent with a direction that the electrical interface faces.

According to the first possible implementation manner of the second aspect, in a second possible implementation manner, the optical interface is disposed at one end of the optical module, and the electrical interface is disposed at the other end of the optical module, or the optical interface and the electrical interface are disposed at a same end of the optical module.

According to the second aspect, or the first or second possible implementation manner of the first aspect, in a third possible implementation manner, the optical module includes two electrical interfaces, and the electrical interfaces are disposed on two sides of the optical interface.

According to a third aspect of the present invention, an optical network device is provided, including at least one line card described in any possible implementation manner of the first aspect and a chassis, where the at least one line card is disposed in an interior of the chassis.

According to the line card, the optical module, and the optical network device that are provided in the embodiments, in the line card provided in the embodiments, the optical module and a wavelength division multiplexer/demultiplexer are disposed on the same line card, an optical interface of the optical module faces a direction that is from an edge of a mainboard to an interior of the mainboard and that is parallel to the mainboard, the optical interface is connected to a first interface, and an optical fiber configured to connect the optical interface and the first interface is located on an inner side of the mainboard of the same line card, so that the optical module and the wavelength division multiplexer/demultiplexer are connected by using an optical fiber disposed in an interior of the optical network device, space utilization efficiency of the optical network device is improved, and optical fibers outside the optical network device are reduced, thereby reducing management difficulty.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

FIG. 2A to FIG. 2H are top views and side views of Embodiment 2 of an optical module according to the present invention.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1A:
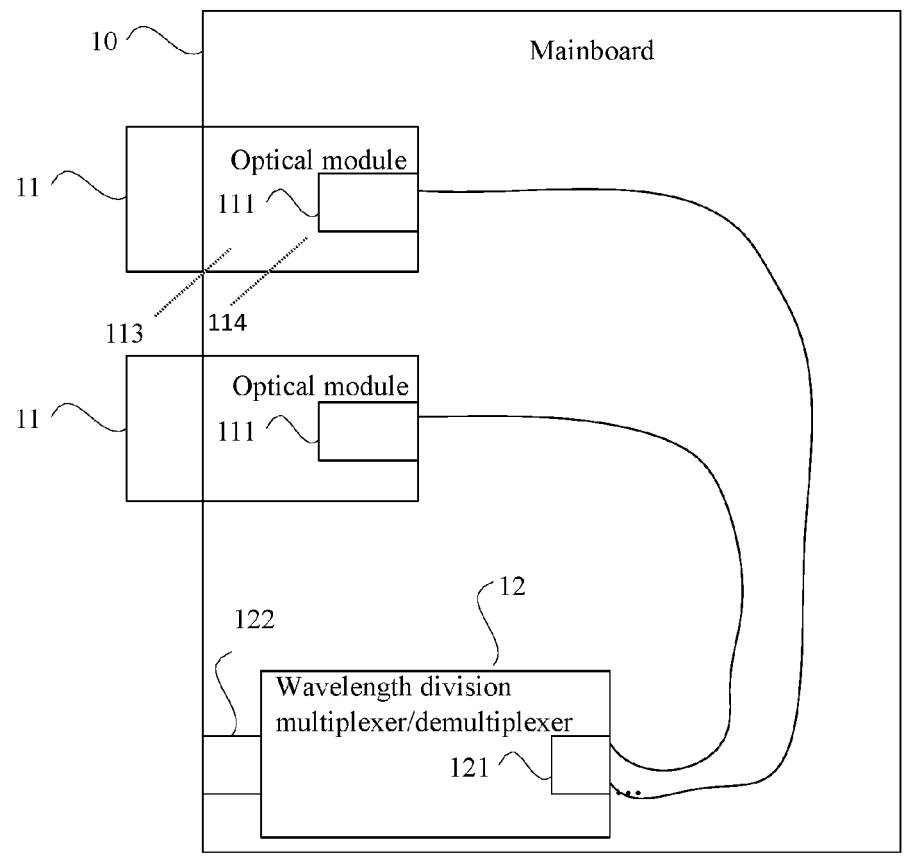
FIG. 1A and FIG. 1B are a main view and a top view of Embodiment 1 of a line card according to the present invention.
Figure 1B:
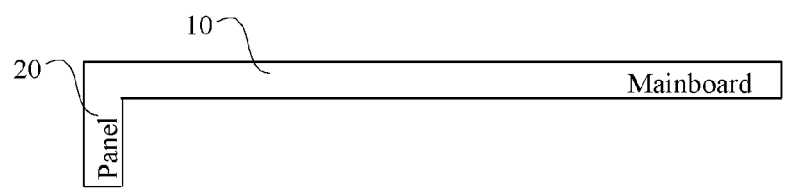

FIG. 1A and FIG. 1B are a main view and a top view of Embodiment 1 of a line card according to the present invention. As shown in FIG. 1A and FIG. 1B, the line card in this embodiment includes a mainboard 10, a panel 20, an optical module 11, and a wavelength division multiplexer/demultiplexer 12, where the panel 20 is disposed on an edge of the mainboard 10, the optical module 11 includes at least one electrical interface (not shown in FIG. 1A or FIG. 1B) and at least one optical interface 111, the wavelength division multiplexer/demultiplexer 12 includes a first interface 121 and a second interface 122, and the optical module 11 may be disposed on the panel 20 by using a through hole on the panel 20.

The electrical interface is electrically connected to the mainboard 10, the optical interface 111 faces a direction that is from the edge of the mainboard 10 to an interior of the mainboard 10 and that is parallel to the mainboard 10, and the optical interface 111 is connected to the first interface 121, the wavelength division multiplexer/demultiplexer 12 is disposed on the mainboard 10, the second interface 122 is configured to connect to a feeder fiber, and the feeder fiber is configured to connect an optical network device at a sending end and an optical network device at a receiving end.

It should be noted that, the optical module 11 involved in this embodiment further includes various functional modules of an existing optical module 11, for example, an optical-to-electrical conversion/electrical-to-optical conversion module, and the functional modules are not enumerated herein. Specifically, the optical module 11 is configured to perform conversion between an optical signal and an electrical signal, where the electrical interface is electrically connected to the mainboard 10, and is configured to receive a to-be-sent electrical signal, an optical signal, obtained after the to-be-sent electrical signal undergoes electrical-to-optical conversion performed by the optical-to-electrical conversion/electrical-to-optical conversion module of the optical module 11, is output from the optical interface 111, and the optical interface 111 may be connected to the wavelength division multiplexer/demultiplexer 12. On the other hand, an optical signal received from the optical interface 111 is converted into an electrical signal, and the electrical signal is output from the electrical interface to an electrical connector on the mainboard 10.

The wavelength division multiplexer/demultiplexer 12 is configured to connect the optical module 11 and the feeder fiber, and an optical fiber configured to connect the optical interface 111 and the first interface 121 may be an optical fiber on the wavelength division multiplexer/demultiplexer 12, or may be an optical fiber provided during connection.

In an existing optical network device, a wavelength division multiplexer/demultiplexer is disposed on a line card, an optical module is disposed on another line card, and the optical module and the wavelength division multiplexer/demultiplexer are connected by using an optical fiber between the line cards; or an optical module is disposed on a line card, a wavelength division multiplexer/demultiplexer is disposed within a module outside a chassis, and the optical module and the wavelength division multiplexer/demultiplexer are connected by using an optical fiber. There are multiple optical fibers outside the optical network device, so that space utilization efficiency of the optical network device is low, management is complex, and a fault is easily caused.

According to the line card provided in this embodiment, an optical module 11 and a wavelength division multiplexer/demultiplexer 12 are disposed on a same line card, an optical interface 111 of the optical module 11 faces a direction that is from an edge of a mainboard 10 to an interior of the mainboard 10 and that is parallel to the mainboard 10, the optical interface 111 is connected to a first interface 121, and an optical fiber configured to connect the optical interface 111 and the first interface 121 is located on an inner side of the mainboard 10 of the same line card, so that the optical module 11 and the wavelength division multiplexer/demultiplexer 12 are connected by using an optical fiber disposed in an interior of an optical network device, space utilization efficiency of the optical network device is improved, and optical fibers outside the optical network device are reduced, thereby reducing management difficulty.

Optionally, an optical module electrical interface socket 113 and an optical module optical interface socket 114 may be disposed on the mainboard, an opening direction of the optical module electrical interface socket 113 and an opening direction of the optical module optical interface socket 114 both face a direction that is from the interior of the mainboard to the edge of the mainboard and that is parallel to the mainboard, and the optical module electrical interface socket 113 and the optical module optical interface socket 114 are configured to connect to the electrical interface and the optical interface.

Positions of the optical interface socket and the electrical interface socket may be determined according to positions of the optical interface and the electrical interface on the optical module, a lead at an end of the optical interface socket may be configured to connect to the first interface, and a possible connection manner may be that, after the optical interface and the foregoing optical interface socket are connected, connection between the optical interface of the optical module and the first interface of the wavelength division multiplexer/demultiplexer may be implemented.

Optionally, the first interface faces the direction that is from the edge of the mainboard to the interior of the mainboard and that is parallel to the mainboard, and the second interface faces the direction that is from the interior of the mainboard to the edge of the mainboard and that is parallel to the mainboard, or the first interface faces the direction that is from the edge of the mainboard to the interior of the mainboard and that is parallel to the mainboard, and the second interface faces the direction that is from the edge of the mainboard to the interior of the mainboard and that is parallel to the mainboard.

Specifically, a form of the wavelength division multiplexer/demultiplexer may include a form shown in FIG. 1A, in which the directions that the first interface and the second interface face are opposite, or positions in which the first interface and the second interface are disposed and directions that the first interface and the second interface face may be set according to needs.

Further, an optical connector may be disposed on the panel of the line card, the optical connector includes a first end and a second end, the first end faces the direction that is from the edge of the mainboard to the interior of the mainboard and that is parallel to the mainboard, and is connected to the second interface, and the second end faces the direction that is from the interior of the mainboard to the edge of the mainboard and that is parallel to the mainboard, and is configured to connect to the feeder fiber.

The optical connector disposed on the panel may be configured to connect the second interface of the wavelength division multiplexer/demultiplexer and the feeder fiber, and the directions that the first end and the second end of the optical connector face may be set according to the directions that the first interface and the second interface of the wavelength division multiplexer/demultiplexer face, to implement connection between wavelength division multiplexer/demultiplexers in different forms and the feeder fiber.

Optionally, the optical module and the wavelength division multiplexer/demultiplexer may be disposed at one end of the mainboard.

Specifically, according to a disposing position, in a cabinet, of the line card, the optical module and the wavelength division multiplexer/demultiplexer may be disposed at one end, near an opening of the cabinet, of the mainboard. Therefore, in an actual application, a length of the feeder fiber may be decreased to facilitate device maintenance.

In addition to what is described in the foregoing embodiment, the direction that the first interface faces may be consistent with the direction that the optical interface faces.

It can be understood that, the optical module and the wavelength division multiplexer/demultiplexer both are disposed at the end, near the opening of the chassis, of the mainboard, and the direction that the first interface faces is consistent with the direction that the optical interface faces, so that the optical fiber configured to connect the first interface and the optical interface is located on the inner side of the mainboard of the line card.

According to the line card provided in this embodiment, an optical module and a wavelength division multiplexer/demultiplexer are disposed on the same line card, an optical interface of the optical module faces a direction that is from an edge of a mainboard to an interior of the mainboard and that is parallel to the mainboard, the optical interface is connected to a first interface, and an optical fiber configured to connect the optical interface and the first interface is located on an inner side of the mainboard of the same line card, so that the optical module and the wavelength division multiplexer/demultiplexer are connected by using an optical fiber disposed in an interior of an optical network device, space utilization efficiency of the optical network device is improved, and optical fibers outside the optical network device are reduced, thereby reducing management difficulty.

In addition to what is described in the foregoing embodiment, the second interface may include a wavelength division multiplexing interface and a wavelength division demultiplexing interface, and the wavelength division multiplexing interface and the wavelength division demultiplexing interface are separately connected to the feeder fiber, or the second interface includes a wavelength division multiplexing/demultiplexing interface, where the wavelength division multiplexing/demultiplexing interface is connected to the feeder fiber.

Specifically, in an architecture in which a wavelength division multiplexing manner is used on an optical transport network, a wavelength division multiplexer and a wavelength division demultiplexer are used, where the wavelength division multiplexer is configured to multiplex optical signals in multiple optical modules to the feeder fiber, and the wavelength division demultiplexer is configured to route optical signals received from the feeder fiber to different optical modules. The second interface may include a wavelength division multiplexing interface and a wavelength division demultiplexing interface, where the wavelength division multiplexing interface and the wavelength division demultiplexing interface are separately connected to the feeder fiber.

In another architecture in which a wavelength division multiplexing manner is used on an optical transport network, a wavelength division multiplexer/demultiplexer is used, and the wavelength division multiplexer/demultiplexer integrates functions of a wavelength division multiplexer and a wavelength division demultiplexer. In the architecture, the second interface includes a wavelength division multiplexing/demultiplexing interface, where the wavelength division multiplexing/demultiplexing interface is connected to the feeder fiber.

According to Embodiment 1 of the line card provided in the present invention, an optical module is disposed on the line card, and an optical module includes at least one electrical interface and at least one optical interface, where the electrical interface is electrically connected to a mainboard disposed on the line card, and the optical interface faces a direction that is from an edge of the mainboard to an interior of the mainboard and that is parallel to the mainboard, and is connected to a first interface of a wavelength division multiplexer/demultiplexer disposed on the line card, and a second interface of the wavelength division multiplexer/demultiplexer is connected to a feeder fiber configured to connect an optical network device at a sending end and an optical network device at a receiving end.

In the prior art, an optical interface and an electrical interface of an optical module are separately disposed at two ends of the optical module, and a direction that the optical interface faces is opposite to a direction that the electrical interface faces.

By setting the directions that the optical interface and the electrical interface of the optical module face in the foregoing embodiment, the optical module is disposed on the line card, so that simultaneous connection of the optical interface and the electrical interface may be implemented.

It can be understood that, if an electrical interface socket and an optical interface socket are disposed on the line card, when the optical module is disposed, the electrical interface and the optical interface of the optical module may be connected to the electrical interface socket and the optical interface socket respectively, so that simultaneous connection of the optical interface and the electrical interface is implemented, and the first interface is connected to the optical module by using a lead at another end of the optical interface socket.

According to the optical module provided in this embodiment, a direction that an optical interface of the optical module faces is consistent with a direction that an electrical interface of the optical module faces, and the optical module is disposed on a line card, so that after the optical interface of the optical module and a first interface disposed on a mainboard of the line card are connected, simultaneous connection of the optical interface and the electrical interface may be implemented, and connection, in an interior of an optical network device, between the optical module and a wavelength division multiplexer/demultiplexer may be implemented, therefore, space utilization efficiency of the optical network device is improved, and optical fibers outside the optical network device are reduced, thereby reducing management difficulty.

The following lists several possible implementation manners of the optical module provided in the present invention, to further describe a structure of the optical module provided in the present invention. FIG. 2A to FIG. 2H are top views and side views of Embodiment 2 of an optical module according to the present invention. As shown in FIG. 2A to FIG. 2D, an optical interface 111 may be disposed at one end of an optical module 11, and an electrical interface 112 may be disposed at the other end of the optical module 11.

As a feasible implementation manner, as shown in FIG. 2A and FIG. 2B, a vertical distance from the electrical interface 112 to a mainboard is less than or equal to a vertical distance from the optical interface 111 to the mainboard. That is, according to the side view in FIG. 2B, the electrical interface 112 and the optical interface 111 are separately located at two ends of the optical module 11, the electrical interface 112 is located below the optical interface 111, a direction that the optical interface 111 faces is consistent with a direction that the electrical interface 112 faces. As another feasible implementation manner, as shown in FIG. 2C and FIG. 2D, the optical module 11 includes two electrical interfaces 112, the electrical interfaces 112 are disposed on two sides of the optical interface 111. That is, according to the top view in FIG. 2C and the side view in FIG. 2D, the two electrical interfaces 112 and the optical interface 111 are separately located at two ends of the optical module 11, the two electrical interfaces 112 are located on two sides of the optical interface 111, and a direction the optical interface 111 faces is consistent with a direction that the electrical interfaces 112 face.

It can be understood that, there may be one electrical interface 112, and the electrical interface 112 is disposed on one side of the optical interface 111.

As shown in FIG. 2E to FIG. 2H, the optical interface 111 and the electrical interface 112 are disposed at a same end of the optical module 11.

As a feasible implementation manner, as shown in FIG. 2E and FIG. 2F, a vertical distance from the electrical interface 112 to a mainboard is less than or equal to a vertical distance from the optical interface 111 to the mainboard. That is, according to the side view in FIG. 2F, the optical interface 111 and the electrical interface 112 are disposed at a same end of the optical module 11, the electrical interface 112 is located just below the optical interface 111, and a direction that the optical interface 111 faces is consistent with a direction that the electrical interface 112 faces.

As another feasible implementation manner, as shown in FIG. 2G and FIG. 2H, the optical module 11 includes one electrical interface 112, where the electrical interface 112 is disposed on a side of the optical interface 111. That is, according to the top view in FIG. 2G and the side view in FIG. 2H, the optical interface 111 and the electrical interface 112 are disposed at a same end of the optical module 11, the electrical interface 112 is located on one side of the optical interface 111, a distance between the electrical interface 112 and one end of the optical module 11 is the same as a distance between the optical interface 111 and the end of the optical module 11, and a direction that the optical interface 111 faces is consistent with a direction that the electrical interface 112 faces. It can be understood that, there may be two electrical interfaces 112, and the electrical interfaces 112 are disposed on two sides of the optical interface 111.

According to the optical module of the line card provided in this embodiment, an optical interface 111 and an electrical interface 112 are separately disposed at two ends of an optical module 11 or are disposed at a same end of the optical module 11, directions that the optical interface 111 and the electrical interface 112 face are consistent, and the optical module 11 is disposed on the line card, so that after the optical interface 111 of the optical module and a first interface disposed on a mainboard of the line card are connected, simultaneous connection of the optical interface 111 and the electrical interface 112 may be implemented, and connection, in an interior of an optical network device, between the optical module and a wavelength division multiplexer/demultiplexer may be implemented; therefore, space utilization efficiency of the optical network device is improved, and optical fiber s outside the optical network device are reduced, thereby reducing management difficulty.

Figure 3:
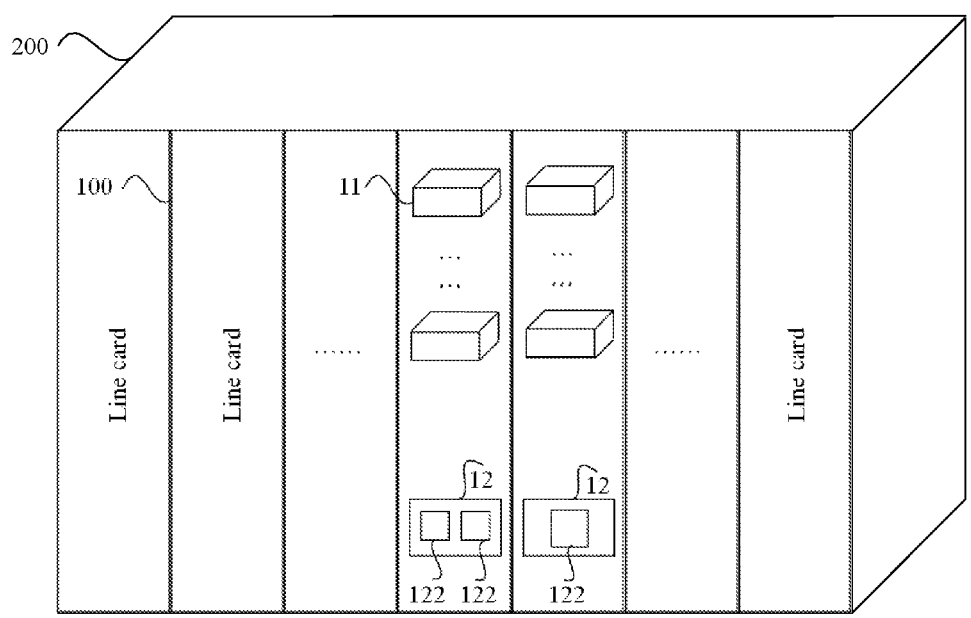
FIG. 3 is a schematic structural diagram of Embodiment 3 of an optical network device according to the present invention.
Figure 4:
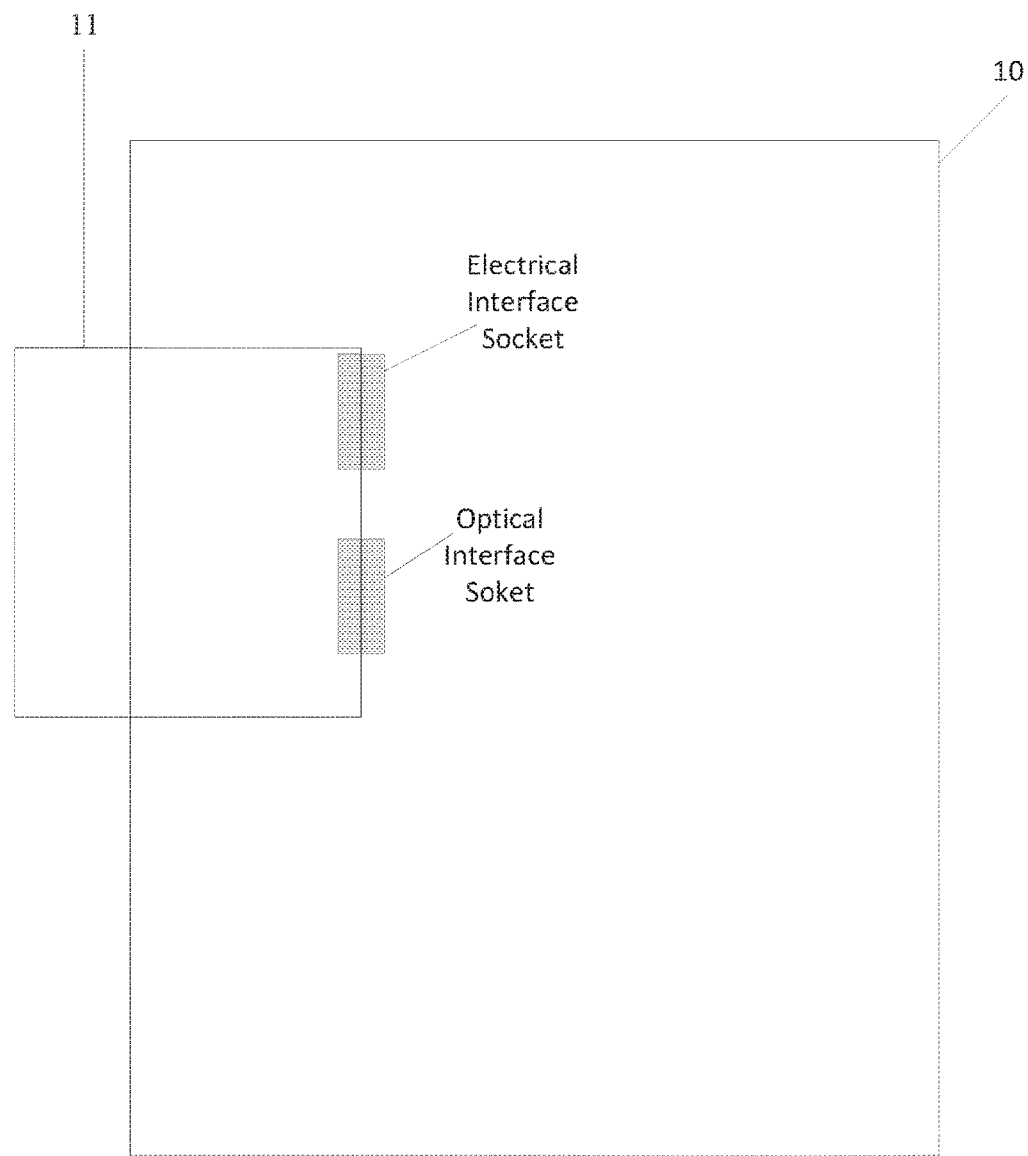
FIG. 4 is a top view showing relationship regarding an optical module, an electrical interface socket and an optical interface socket.

FIG. 3 is a schematic structural diagram of Embodiment 3 of an optical network device according to the present invention. As shown in FIG. 3, the optical network device in this embodiment includes at least one line card 100 in any one of the foregoing embodiments and a chassis 200, where the at least one line card 100 is disposed in an interior of the chassis 200.

The chassis 200 may have a structure of a rectangular cuboid or a cube, an opening may be disposed on one surface of the chassis 200, the at least one line card 100 is inserted into the interior of the chassis 200 from the opening of the chassis 200, and a panel of the line card 100 is located on one side, with the opening, of the chassis 200 after the line card 100 is inserted into the chassis 200. As shown in FIG. 3, an optical module 11 and a wavelength division multiplexer/demultiplexer 12 in the foregoing embodiments are separately disposed on a mainboard of a line card 100, where the wavelength division multiplexer/demultiplexer 12 includes a wavelength division multiplexer and a wavelength division demultiplexer, and second interfaces 122 configured to connect to a feeder fiber are separately disposed on the wavelength division multiplexer and the wavelength division demultiplexer; an optical module 11 and a wavelength division multiplexer/demultiplexer 12 in the foregoing embodiments are separately disposed on a mainboard of another line card 100, the wavelength division multiplexer/demultiplexer 12 may be a wavelength division multiplexer/demultiplexer that integrates a wavelength division multiplexing function and a wavelength division demultiplexing function, a second interface 122 configured to connect to a feeder fiber is disposed on the wavelength division multiplexer/demultiplexer, and an optical fiber connection cable configured to connect an optical interface of the optical module 11 and the wavelength division multiplexer/demultiplexer 12 is located on an inner side of the line card and in an interior of the optical network device.

According to the optical network device provided in this embodiment, a line card 100 in any one of the foregoing embodiments is disposed in a chassis 200, and an optical fiber connection cable configured to connect an optical interface of an optical module 11 and a first interface of a wavelength division multiplexer/demultiplexer 12 is located on an inner side of a mainboard of the same line card and in an interior of the optical network device, so that the optical module and the wavelength division multiplexer/demultiplexer are connected by using an optical fiber disposed in the interior of the optical network device, space utilization efficiency of the optical network device is improved, and optical fiber s outside the optical network device are reduced, thereby reducing management difficulty.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A line card, comprising:
a mainboard comprising an interfacing side on an outer edge of the mainboard;
an optical module, disposed on the mainboard at the interfacing side and comprising an electrical interface and an optical interface, the optical module having a proximal side and a distal side such that the proximal side of the optical module is closer to the interfacing side of the mainboard than the distal side of the optical module, wherein the optical module is electrically connected to the mainboard at the electrical interface, and wherein the optical interface is disposed at the distal side of the optical module and is parallel to the interfacing side of the mainboard; and
a wavelength division multiplexer/demultiplexer, disposed on the mainboard at the interfacing side and comprising a first interface and a second interface, the wavelength division multiplexer/demultiplexer having a proximal side and a distal side such that the proximal side of the wavelength division multiplexer/demultiplexer is closer to the interfacing side of the mainboard than the distal side of the wavelength division multiplexer/demultiplexer, the first interface being disposed at the distal side of the wavelength division multiplexer/demultiplexer and the second interface being disposed at the proximal side of the wavelength division multiplexer/demultiplexer, wherein the optical interface is configured to connect to the first interface, and wherein the second interface is configured to connect to a feeder fiber, and the feeder fiber is configured to connect an optical network device at a sending end and an optical network device at a receiving end; and
an optical module electrical interface socket disposed on the mainboard; and
an optical module optical interface socket disposed on the mainboard;
wherein an opening direction of the optical module electrical interface socket and an opening direction of the optical module optical interface socket both face a direction that is from the interior of the mainboard to the edge of the mainboard and that is parallel to the mainboard, and wherein the optical module electrical interface socket and the optical module optical interface socket are configured to connect to the electrical interface and the optical interface.

2. The line card according to claim 1, wherein the first proximal side of the multiplexer/demultiplexer is parallel to the interfacing side of the mainboard, and the distal side of the division multiplexer/demultiplexer is opposite to the proximal side of the multiplexer/demultiplexer.

3. The line card according to claim 1, further comprising an optical connector disposed on a panel of the line card, wherein the optical connector comprises:
- a first end connected to the second interface and facing the direction that is from the interfacing side of the mainboard to the interior of the mainboard and that is parallel to the mainboard; and
- a second end facing the direction that is from the interior of the mainboard to the interfacing side of the mainboard and that is parallel to the mainboard, wherein the second end is configured to connect to the feeder fiber.

4. The line card according to claim 1, wherein a direction that the first interface faces is consistent with a direction that the optical interface faces.

5. The line card according to claim 1, wherein the second interface comprises a wavelength division multiplexing interface and a wavelength division demultiplexing interface, and the wavelength division multiplexing interface and the wavelength division demultiplexing interface are separately connected to the feeder fiber.

6. The line card according to claim 1, wherein the second interface comprises a wavelength division multiplexing/demultiplexing interface, and the wavelength division multiplexing/demultiplexing interface is connected to the feeder fiber.

7. An optical network device, comprising:
- a line card; and
- a chassis, wherein the line card is disposed in an interior of the chassis, and wherein the line card comprises:
  - a mainboard;
  - an optical module, disposed on the mainboard at the interfacing side and comprising an electrical interface and an optical interface, the optical module having a proximal side and a distal side such that the proximal side of the optical module is closer to the interfacing side of the mainboard than the distal side of the optical module, wherein the optical module is electrically connected to the mainboard at the electrical interface, and wherein the optical interface is disposed at the distal side of the optical module and is parallel to the interfacing side of the mainboard; and
  - a wavelength division multiplexer/demultiplexer, disposed on the mainboard at the interfacing side and comprising a first interface and a second interface, the wavelength division multiplexer/demultiplexer having a proximal side and a distal side such that the proximal side of the wavelength division multiplexer/demultiplexer is closer to the interfacing side of the mainboard than the distal side of the wavelength division multiplexer/demultiplexer, the first interface being disposed on the distal side of the wavelength division multiplexer/demultiplexer and the second interface being disposed on the proximal side of the wavelength division multiplexer/demultiplexer, wherein the optical interface is configured to connect to the first interface, and wherein the second interface is configured to connect to a feeder fiber, and the feeder fiber is configured to connect an optical network device at a sending end and an optical network device at a receiving end, and
  - an optical module electrical interface socket disposed on the mainboard; and
  - an optical module optical interface socket disposed on the mainboard;
  - wherein an opening direction of the optical module electrical interface socket and an opening direction of the optical module optical interface socket both face a direction that is from the interior of the mainboard to the edge of the mainboard and that is parallel to the mainboard, and wherein the optical module electrical interface socket and the optical module optical interface socket are configured to connect to the electrical interface and the optical interface.

8. An optical module disposed on a mainboard of a line card, the mainboard comprising an interfacing side on an outer edge of the mainboard and the optical module being disposed on the mainboard at the interfacing side of the mainboard, and comprising:
- a proximal side and a distal side such that the proximal side of the optical module is closer to the interfacing side of the mainboard than the distal side of the optical module;
- an electrical interface electrically where the optical module is connected to the mainboard; and
- an optical interface, disposed at the distal side of the optical module, wherein the distal side is parallel to the interfacing side of the mainboard, and; and, wherein
- the optical interface is connected to a first interface of a wavelength division multiplexer/demultiplexer, wherein
- the wavelength division multiplexer/demultiplexer is disposed on the mainboard at the interfacing side and comprising the first interface and a second interface;
- the wavelength division multiplexer/demultiplexer has a proximal side and a distal side such that the proximal side of the wavelength division multiplexer/demultiplexer is closer to the interfacing side of the mainboard than the distal side of the wavelength division multiplexer/demultiplexer and the proximal sides of the wavelength division multiplexer/demultiplexer and the optical module are arranged parallel along the interfacing side of the mainboard;
- the first interface is disposed at the distal side of the wavelength division multiplexer/demultiplexer and the second interface is disposed at the proximal side of the wavelength division multiplexer/demultiplexer; and
- the second interface of the wavelength division multiplexer/demultiplexer is connected to a feeder fiber that is configured to connect to an optical network device at a sending end and an optical network device at a receiving end; and
- an optical module electrical interface socket disposed on the mainboard; and
- an optical module optical interface socket disposed on the mainboard;
- wherein an opening direction of the optical module electrical interface socket and an opening direction of the optical module optical interface socket both face a direction that is from the interior of the mainboard to the edge of the mainboard and that is parallel to the mainboard, and wherein the optical module electrical interface socket and the optical module optical interface socket are configured to connect to the electrical interface and the optical interface.

9. The optical module according to claim 8, wherein a direction that the optical interface faces is consistent with a direction that the electrical interface faces.

10. The optical module according to claim 9, wherein the optical interface is disposed at one end of the optical module, and the electrical interface is disposed at the other end of the optical module; or the optical interface and the electrical interface are disposed at a same end of the optical module.

11. The optical module according to claim 8, wherein the optical module comprises two electrical interfaces, and the electrical interfaces are disposed on two sides of the optical interface.

12. The optical network device according to claim 7, wherein first proximal side of the multiplexer/demultiplexer is parallel to the mainboard, and the distal side of the multiplexer/demultiplexer is opposite to the proximal side of the multiplexer/demultiplexer.

13. The optical network device according to claim 7, further comprising an optical connector disposed on the panel, wherein the optical connector comprises:
 a first end connected to the second interface and facing a direction that is away from the interfacing side of the mainboard towards the interior of the mainboard and that is parallel to the mainboard; and
 a second end configured to connect to the feeder fiber and facing the direction that is away from the interior of the mainboard towards the interfacing side of the mainboard and that is parallel to the mainboard.

14. The line card according to claim 1, wherein the first proximal side of the multiplexer/demultiplexer is parallel to the mainboard, and the distal side of the multiplexer/demultiplexer is opposite to the proximal side of the multiplexer/demultiplexer.

* * * * *